(12) United States Patent
Xu (10) Patent No.: US 11,531,219 B2
(45) Date of Patent: Dec. 20, 2022

(54) OPTICAL MODULE HAVING EXTERNALLY-MOUNTED MAGNETIC RING AND CHIP POSITIONING ANGLE AND PRESSING BLOCK STRUCTURE THEREOF

(71) Applicant: Jun Xu, Beijing (CN)

(72) Inventor: Jun Xu, Beijing (CN)

( * ) Notice: Subject to any disclaimer, the term of this patent is extended or adjusted under 35 U.S.C. 154(b) by 362 days.

(21) Appl. No.: 16/636,337

(22) PCT Filed: Jul. 24, 2019

(86) PCT No.: PCT/CN2019/097404
§ 371 (c)(1),
(2) Date: Feb. 4, 2020

(87) PCT Pub. No.: WO2020/173042
PCT Pub. Date: Sep. 3, 2020

(65) Prior Publication Data
US 2021/0223580 A1  Jul. 22, 2021

(51) Int. Cl.
*G02F 1/09* (2006.01)
*G02F 1/095* (2006.01)
*G02F 1/03* (2006.01)

(52) U.S. Cl.
CPC ............... *G02F 1/091* (2013.01); *G02F 1/03* (2013.01); *G02F 1/095* (2013.01)

(58) Field of Classification Search
CPC . G02F 1/09; G02F 1/091; G02F 1/093; G02F 1/095; G02F 1/03; G02B 6/26; G02B 6/42; G02B 6/36; G02B 6/521; G02B 6/2746; G02B 6/4208; G02B 6/4204; G02B 6/4292; G02B 6/4207; G02B 6/3816; G02B 6/3846; G02B 6/3825; G02B 6/3874; G02B 6/3845
USPC .... 359/280, 484.02, 484.03, 487.05, 487.06, 359/484, 903; 385/92, 85, 11, 88, 83, 73, 385/31
See application file for complete search history.

(56) References Cited

U.S. PATENT DOCUMENTS 7,374,346 B2 * 5/2008 Tanaka .................. G02B 6/421
385/47
2011/0170830 A1 * 7/2011 Uno ..................... G02B 6/4208
385/88

* cited by examiner

*Primary Examiner* — Jie Lei
(74) *Attorney, Agent, or Firm* — Leong C. Lei (57) ABSTRACT

An optical module having an externally-mounted magnetic ring and a chip positioning angle and a pressing block structure thereof are disclosed. The pressing block structure includes a pressing block. The pressing block includes a pressing block body. The pressing block body is provided with an insertion core positioning hole, a chip accommodating hole, and a magnetic ring accommodating chamber. The chip accommodating hole is provided with at least one positioning angle. The overall assembly accuracy of the optical module is improved, the material cost of the isolator chip is reduced, the positioning of the chip is more accurate, and the occurrence of glue overflow can be avoided.

14 Claims, 6 Drawing Sheets

OPTICAL MODULE HAVING EXTERNALLY-MOUNTED MAGNETIC RING AND CHIP POSITIONING ANGLE AND PRESSING BLOCK STRUCTURE THEREOF

BACKGROUND OF THE INVENTION

1. Field of the Invention

The present invention relates to the field of optical communication, and more particularly to an optical module having an externally-mounted magnetic ring and a chip positioning angle and a pressing block structure thereof.

2. Description of the Prior Art

In recent years, with the increasing speed of data transmission, the traditional telecommunication is unable to meet the transmission needs in various fields. Optical communication technology makes up for the shortcomings of the traditional telecommunication technology, such as short transmission distance, large energy consumption, and slow transmission speed, so it is widely used in various data transmission. In an optical communication module, when light from a light source, such as a laser, passes through various optical components or optical fibers (or comes out from optical components or optical fibers), part of the light will be reflected or scattered at the end or inside of the various optical components or optical fibers. When the reflected or refracted light returns through the original path, it will interfere with the optical signal and affect the signal quality and stability of the optical communication. Therefore, the isolator in an optical module becomes an indispensable part of optical communication.

Figure 1:
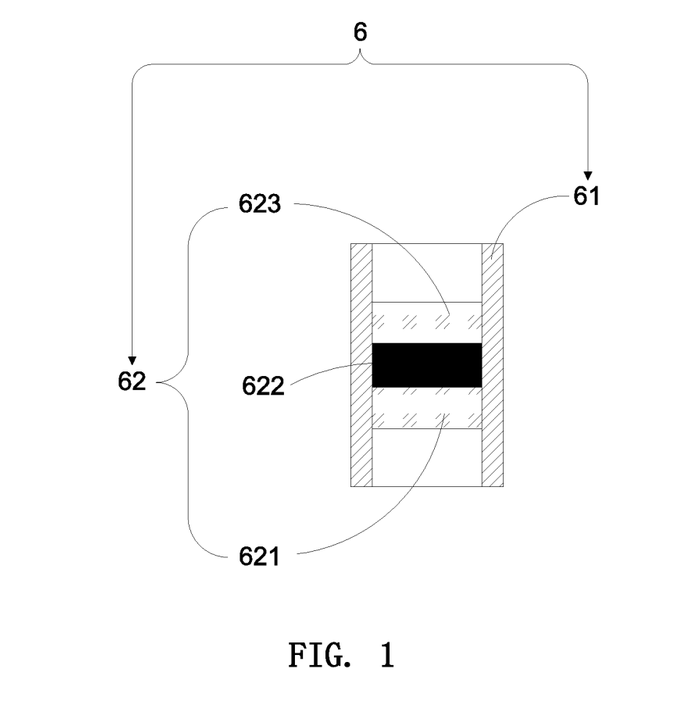
FIG. 1 is a schematic structural view of an isolator in a conventional optical module.

Isolators used in conventional optical modules are mostly polarization-dependent free space isolators (FSI). As shown in FIG. 1, a conventional isolator 6 is composed of a magnetic ring 61 and an isolator chip 62 in the magnetic ring 61. The isolator chip 62 is composed of three components: a Faraday rotator 622, a polarizer 621 disposed on one side of the Faraday rotator 622, and an analyzer 623 disposed on the other side of the Faraday rotator 622. The Faraday rotator 622 in a magnetic field can rotate the vibration surface of incident light by 45°. The polarizer 621 and the analyzer 623 are both polarizers to filter light outside the target direction, thereby unifying the directions of the optical signals incident into the optical module, so as to avoid interference.

Figure 2:
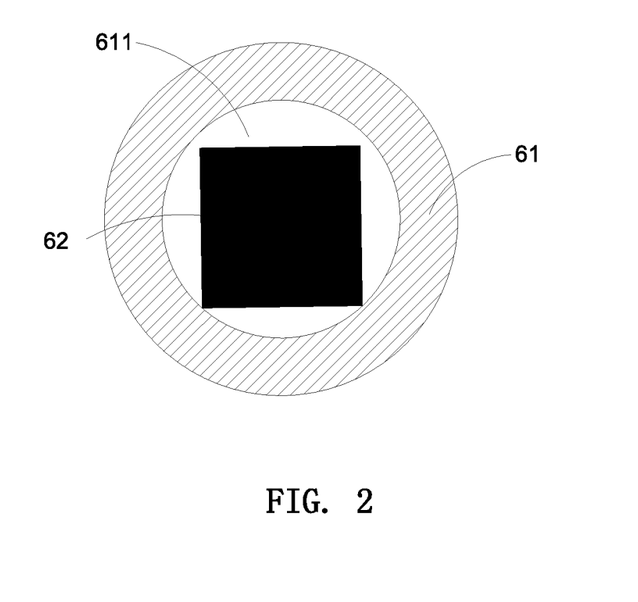
FIG. 2 is a schematic structural view of an isolator chip installed in a mounting hole in the conventional optical module.

However, in the conventional optical module, the mounting hole 611 of the magnetic ring 61, used for mounting the isolator chip 62, is a round hole. The isolator chip 62 generally has a square shape. In assembly, in order to make the mounting angle of the isolator chip 62 appropriate, multiple corrections are required. This reduces the assembly efficiency. In addition, the round mounting hole 611 of the magnetic ring 61 may cause the isolator chip 62 to rotate, which not only increases the difficulty of assembly to increase the production cost of the optical module greatly, but also causes the isolator chip 62 to fail, unable to play the role of rotating the direction of the optical signal. Because the isolator chip 62 is generally fixed by an adhesive means, as shown in FIG. 2, there are many gaps between the isolator chip 62 and the round mounting hole 611, and the glue needs to fill these gaps. Increasing the use of glue will not only increase the production cost, but also cause the stress of the glue to affect the reliability of the isolator chip, for example, if the stress is too high when the glue is cured, the isolator chip will fail, or if the stress is unbalanced, the isolator chip will shift. It is easy to cause glue overflow to affect the product quality.

Furthermore, in the conventional optical module, the isolator chip 62 is directly installed in the magnetic ring 61, and the magnetic ring 61 is installed in a corresponding metal block. As a result, the coaxiality between the isolator chip 62 and the ceramic insertion core is relatively low, so that the isolator chip 62 needs a large area for the tolerances. The isolator chip 62 is expensive, which causes the cost of the overall optical module to be high.

In order to further improve the assembly efficiency of optical modules and reduce the production costs of optical modules, the inventor of the present invention has devoted himself based on his many years of practical experiences to solve these problems.

SUMMARY OF THE INVENTION

(1) Technical Problem to be Solved

The primary object of the present invention is to provide an optical module having an externally-mounted magnetic ring and a chip positioning angle and a pressing block structure thereof, which improves the assembly accuracy, and solves the problems of the difficulty of assembling an isolator chip, the high assembly cost, and the large area of the required isolator chip. In order to achieve the above object, the present invention adopts the following technical solutions:

(2) Technical Solutions

An optical module comprises a metal front cover, a ceramic sleeve, a pressing block, and a ceramic insertion core. The ceramic sleeve is disposed in the metal front cover and fixed by the pressing block. One end of the ceramic insertion core is disposed in the ceramic sleeve. Another end of the ceramic insertion core is fixed in the pressing block. The pressing block includes a pressing block body. The pressing block body is an integral structure. One end of the pressing block body is formed with an insertion core positioning hole for fixing the another end of the ceramic insertion core. Another end of the pressing block body is formed with a chip accommodating hole for accommodating an isolator chip and a magnetic ring accommodating chamber for accommodating a magnetic ring. The chip accommodating hole coaxially communicates with the insertion core positioning hole. The magnetic ring accommodating chamber is arranged around the chip accommodating hole. The insertion core positioning hole is a round hole. The chip accommodating hole is provided with at least one positioning angle for positioning the isolator chip.

Preferably, the positioning angle is a right angle.

Preferably, the positioning angle includes four positioning angle arranged at four corners of the chip accommodating hole.

Preferably, the chip accommodating hole is a square hole.

Preferably, the four positioning angles of the chip accommodating hole are connected through a curved surface.

Preferably, the magnetic ring accommodating chamber is an annular groove and is coaxial with the chip accommodating hole.

Preferably, the magnetic ring accommodating chamber is an annular concave platform and is coaxial with the chip accommodating hole.

The present invention further provides a pressing block structure for an optical module, comprising a pressing block body. The pressing block body is an integral structure. One end of the pressing block body is formed with an insertion core positioning hole for fixing one end of a ceramic insertion core. Another end of the pressing block body is formed with a chip accommodating hole for accommodating an isolator chip and a magnetic ring accommodating chamber for accommodating a magnetic ring. The chip accommodating hole coaxially communicates with the insertion core positioning hole. The magnetic ring accommodating chamber is arranged around the chip accommodating hole. The insertion core positioning hole is a round hole. The chip accommodating hole is provided with at least one positioning angle for positioning the isolator chip.

Preferably, the positioning angle is a right angle.

Preferably, the positioning angle includes four positioning angle arranged at four corners of the chip accommodating hole.

Preferably, the chip accommodating hole is a square hole.

Preferably, the four positioning angles of the chip accommodating hole are connected through a curved surface.

Preferably, the magnetic ring accommodating chamber is an annular groove and is coaxial with the chip accommodating hole.

Preferably, the magnetic ring accommodating chamber is an annular concave platform and is coaxial with the chip accommodating hole.

(3) Beneficial Effect

Compared with the prior art, the present invention has obvious advantages and beneficial effects.

The pressing block of the press-fit ceramic insertion core is provided with the isolator chip accommodating hole, and then the magnetic ring is installed in the pressing block, which is suitable for ordinary isolator chips. The isolator chip is directly installed in the pressing block, so that the coaxiality of the chip and the insertion core after assembled is higher, the area required for the chip to cover the optical path is reduced, and the material cost and production cost of the isolator chip are reduced. The chip accommodating hole in the pressing block, used for assembling the isolator chip, is provided with the positioning angle, so that the isolator chip can be positioned more accurately during installation without the need for complicated correction, which greatly reduces the assembly difficulty and cost of the isolator chip, improves production efficiency, and avoids the failure of the isolator chip due to rotation.

BRIEF DESCRIPTION OF THE DRAWINGS

Embodiments of the present invention will now be described, by way of example only, with reference to the accompanying drawings.

DETAILED DESCRIPTION OF THE PREFERRED EMBODIMENTS

Hereinafter, embodiments of the present invention will be described in detail. Examples of the embodiments are shown in the drawings, wherein the same or similar reference numerals indicate the same or similar elements or elements having the same or similar functions. The embodiments described below with reference to the drawings are exemplary and are intended to explain the present invention, but should not be construed as limiting the present invention.

Embodiments of the present invention will now be described, by way of example only, with reference to the accompanying drawings.

Referring to FIG. 3 to FIG. 11, an optical module having an externally-mounted magnetic ring and a chip positioning angle comprises a metal front cover 1, a ceramic sleeve 2, a pressing block 3, and a ceramic insertion core 4.

Figure 3:
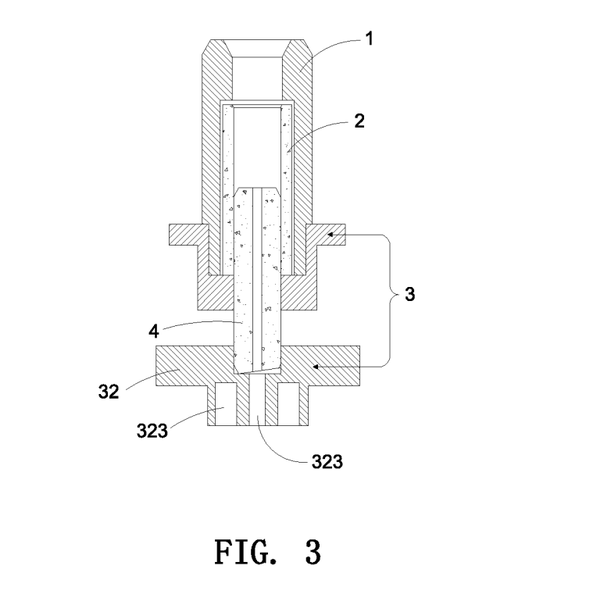
FIG. 3 is a schematic structural view of an optical module in the present invention.

The ceramic sleeve 2 is disposed in the metal front cover 1 and is fixed by the pressing block 3. One end of the ceramic insertion core 4 is disposed in the ceramic sleeve 2, and another end of the ceramic insertion core 4 is fixed in the pressing block 3.

The pressing block 3 includes a pressing block body 32. The pressing block body 32 is an integral structure. One end of the pressing block body 32 is formed with an insertion core positioning hole 322 for fixing the another end of the ceramic insertion core 4. Another end of the pressing block body 32 is formed with a chip accommodating hole 321 for accommodating an isolator chip 5 and a magnetic ring accommodating chamber 323 for accommodating a magnetic ring 7. The chip accommodating hole 321 coaxially communicates with the insertion core positioning hole 322. The magnetic ring accommodating chamber 323 is arranged around the chip accommodating hole 321. The insertion core positioning hole 322 is a round hole.

The chip accommodating hole 321 is provided with at least one positioning angle 321a for positioning the isolator chip 5, which makes the positioning of the isolator chip 5 more accurate without the need for complicated correction. The assembly difficulty and cost of the isolator chip 5 are reduced greatly, the production efficiency is improved, and the failure of the isolator chip 5 due to rotation is avoided.

Because the isolator chip 5 has a square shape, in order to cooperate with it, the positioning angle 321a is a right angle. Preferably, the number of the positioning angles 321a is four, and they are arranged at four corners of the chip accommodating hole 321.

For the specific structure of the pressing block body 32, the chip accommodating hole 321 and the magnetic ring accommodating chamber 323, a plurality of embodiments are provided below for specific description.

Embodiment 1

Figure 4:
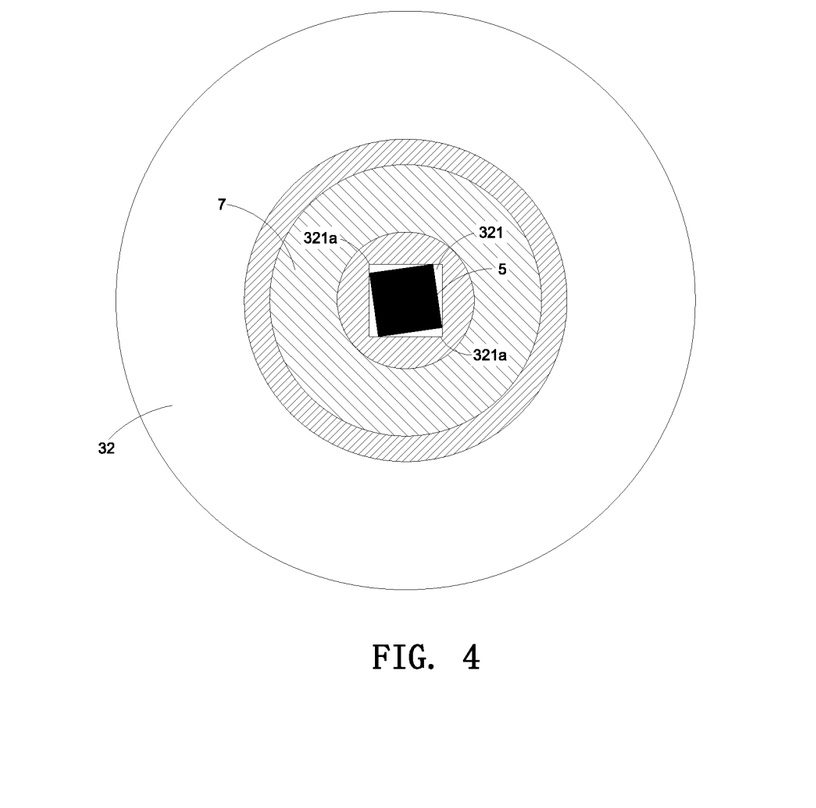
FIG. 4 is a transverse cross-sectional view of an isolator chip mounted in a pressing block body in an embodiment 1.

As shown in FIG. 4, the chip accommodating hole 321 is a square hole and its side length is slightly greater than that of the isolator chip 5, so that the isolator chip 5 is in clearance fit with the chip accommodating hole 321. Because the isolator chip 5 is fixed by an adhesive means, if it is installed in a round hole, there are many gaps between the isolator chip 5 and the hole wall, and the glue needs to fill these gaps. Increasing the use of glue will not only increase the production cost but also cause the glue stress to affect the failure of the isolator chip. Besides, it is easy to cause glue overflow to affect the product quality. Therefore, when the chip accommodating hole 321 is a square hole, these gaps can be minimized to avoid the occurrence of glue overflow, the use of glue is reduced, and the impact of the stress of the glue on the reliability of the isolator chip is reduced, so that the assembly cost of the optical module is reduced.

Embodiment 2

Figure 5:
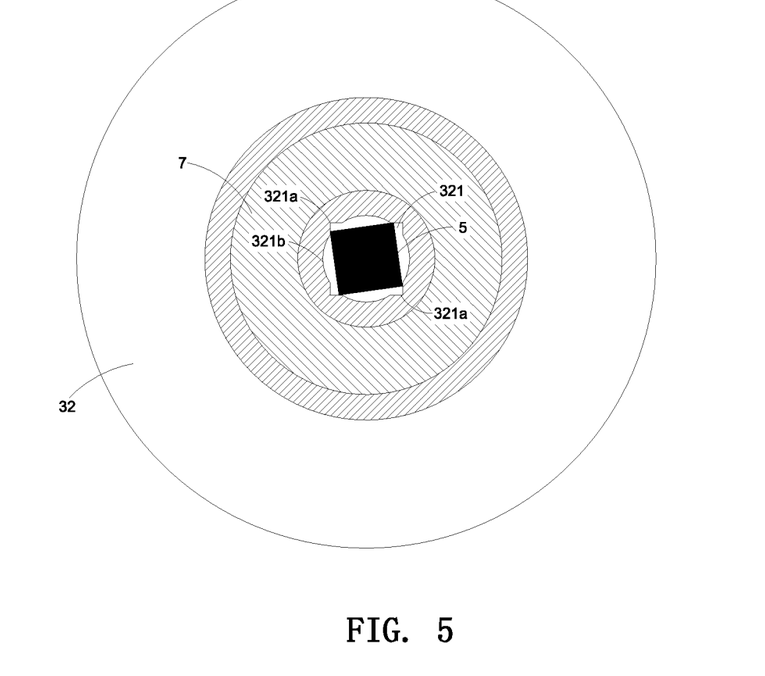
FIG. 5 is a transverse cross-sectional view of an isolator chip mounted in a pressing block body in an embodiment 2.

As shown in FIG. 5, the isolator chip 5 is positioned by four positioning angles 321a, and it is not in contact with the hole wall. The four positioning angles 321a of the chip accommodating hole 321 are connected through a curved surface 321b, so as to reduce processing difficulty.

Embodiment 3

As shown in FIGS. 6-11, the pressing block body 32 is an integral structure. One end of the pressing block body 32 is formed with an insertion core positioning hole 322 for fixing one end of the ceramic insertion core 4, and another end of the pressing block body 32 is formed with a chip accommodating hole 321 for accommodating the isolator chip 5, thereby ensuring the coaxiality of the insertion core positioning hole 322 and the chip accommodating 321. Compared with the split structure, this integral structure changes the two-step assembly required for installing the isolator chip 5 into one-step assembly. The tolerance for the assembly of the optical module is reduced and the coaxiality of the ceramic insertion core 4 and the isolator chip 5 after assembled is improved, which is beneficial to reduce the area of the isolator chip 5.

In view of the fact that the isolator chip 5 needs to be in a magnetic field, a magnetic ring 7 is required to generate a magnetic field. Various embodiments are provided here to explain the shapes of the magnetic ring accommodating chamber 323 and the pressing block body 32 and the installation of the magnetic ring 7.

Embodiment 3.1

Figure 6:
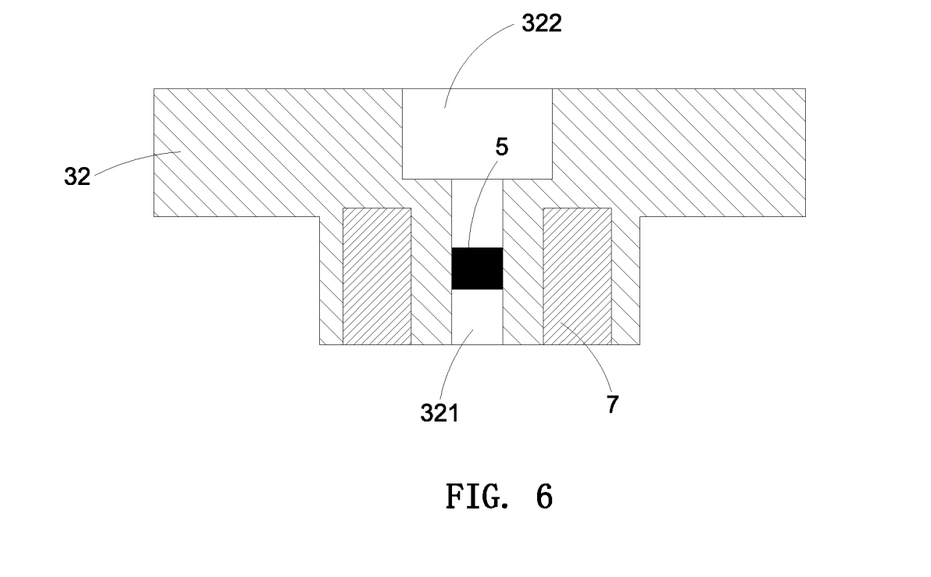
FIG. 6 is a vertical cross-sectional view of an isolator chip mounted in a pressing block body in an embodiment 3.1.
Figure 7:
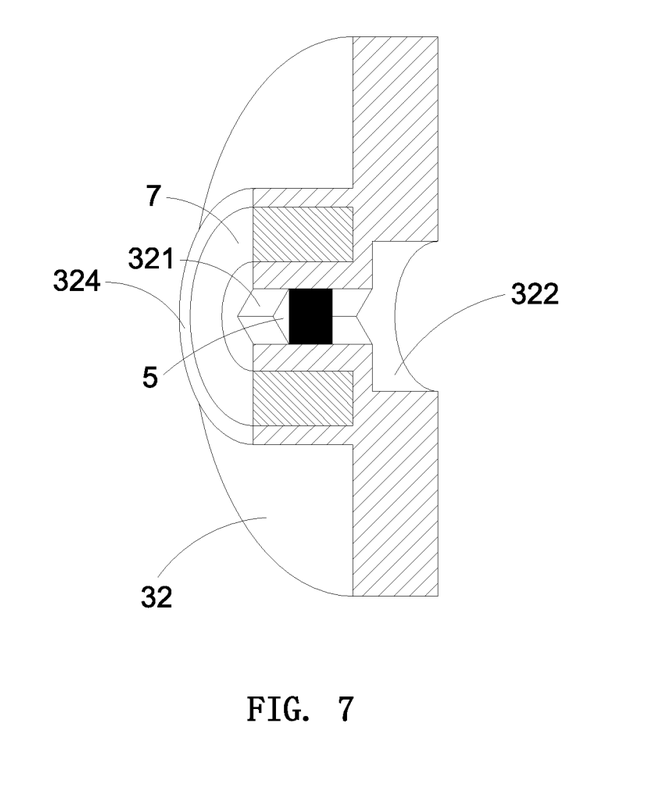
FIG. 7 is a perspective cross-sectional view of an isolator chip mounted in a pressing block body in an embodiment 3.1.
Figure 8:
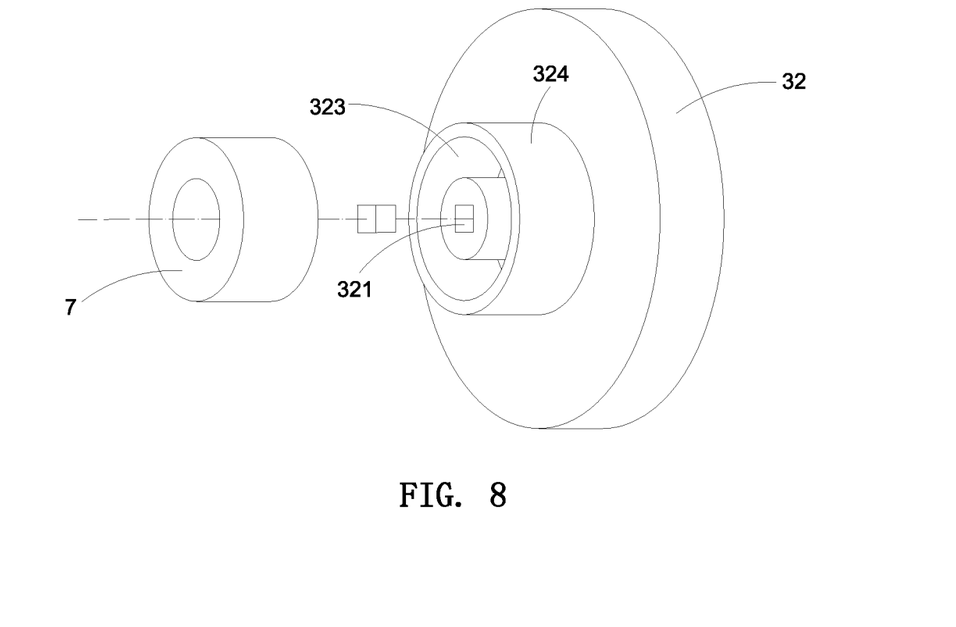
FIG. 8 is a schematic view of an isolator chip and a magnetic ring in an embodiment 3.1.

As shown in FIGS. 6-8, one end of the pressing block body 32, having the magnetic ring accommodating chamber 323, is formed with a cylindrical raised platform 324, so that the output (input) ends of the optical module and the optical signal can be fitted better. A magnetic ring accommodating chamber 323 in the form of an annular groove and a chip accommodating hole 321 are disposed in the raised platform 324. In assembly, the magnetic ring 7 and the isolator chip 5 are installed in the magnetic ring accommodating chamber 323 and the chip accommodating hole 321, respectively. The insertion core positioning hole 322 and the chip accommodating hole 321 are coaxial, and the magnetic ring 7 is not in contact with the isolator chip 5 when installed, so the coaxiality of the ceramic insertion core 4 and the isolator chip 5 can be guaranteed, which is beneficial to reduce the area of the isolator chip 5.

Embodiment 3.2

Figure 9:
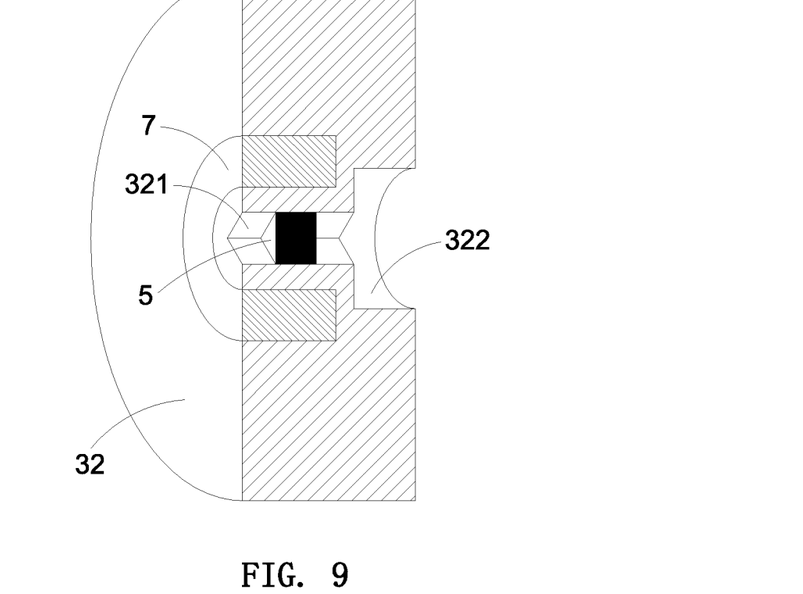
FIG. 9 is a perspective cross-sectional view of an isolator chip mounted in a pressing block body in an embodiment 3.2.

As shown in FIG. 9, the pressing block body 32 is a cylindrical body. The magnetic ring accommodating chamber 323 in the form of an annular groove is directly disposed at one end of the pressing block body 32. The chip accommodating hole 321 is disposed in the middle of this end. The insertion core positioning hole 322 is disposed at the other end of the pressing block body 32. In assembly, the magnetic ring 7 and the isolator chip 5 are installed in the magnetic ring accommodating chamber 323 and the chip accommodating hole 321, respectively. In this structure, the magnetic ring 7 is also not in contact with the isolator chip 5 when installed. The coaxiality of the ceramic insertion core 4 and the isolator chip 5 can be guaranteed, which is beneficial to reduce the area of the isolator chip 5.

Embodiment 3.3

Figure 10:
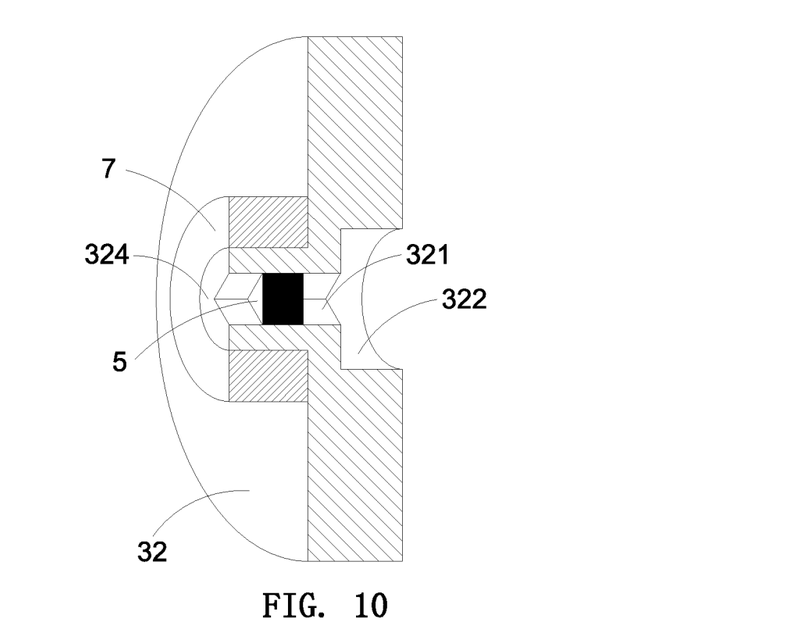
FIG. 10 is a perspective cross-sectional view of an isolator chip mounted in a pressing block body in an embodiment 3.3.

As shown in FIG. 10, one end of the pressing block body 32, having the magnetic ring accommodating chamber 323, is formed with a cylindrical raised platform 324, and the other end of the pressing block body 32 is formed with an insertion core positioning hole 322. A chip accommodating hole 321 is disposed in the raised platform 324. A magnetic ring accommodating chamber 323 in the form of a concave platform is formed on the outer side of the raised platform 324. In assembly, the magnetic ring 7 is sleeved on the raised platform 324, and the isolator chip 5 is installed in the chip accommodating hole 321. Similarly, the insertion core positioning hole 322 and the chip accommodating hole 321 are coaxial, and the magnetic ring 7 is not in contact with the isolator chip 5 when installed, so the coaxiality of the ceramic insertion core 4 and the isolator chip 5 can be guaranteed, which is beneficial to reduce the area of the isolator chip 5.

Embodiment 3.4

Figure 11:
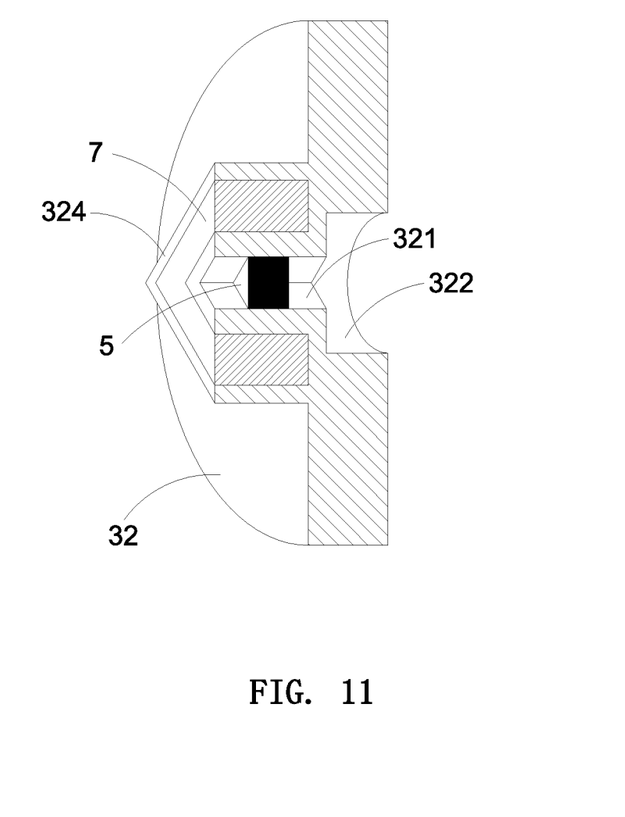
FIG. 11 is a perspective cross-sectional view of an isolator chip mounted in a pressing block body in an embodiment 3.4.

As shown in FIG. 11, a square raised platform 324 is provided at one end of the pressing block body 32, and the magnetic ring accommodating chamber 323 in the form of a square groove is disposed in the square raised platform 324. The magnetic ring accommodating chamber 323 is arranged around the square chip accommodating hole 321. The square magnetic ring 7 is installed in the magnetic ring accommodating chamber 323. The four sides of the magnetic ring 7 are parallel to the isolator chip 5. As mentioned above, the insertion core positioning hole 322 and the chip accommodating hole 321 are coaxial, and the magnetic ring 7 is not in contact with the isolator chip 5 when installed, so the coaxiality of the ceramic insertion core 4 and the isolator chip 5 can be guaranteed, which is beneficial to reduce the area of the isolator chip 5.

The present invention further provides a pressing block structure for an optical module with an externally-mounted magnetic ring and a chip positioning angle as described above, comprising a pressing block body 32. The pressing block body 32 is an integral structure. One end of the pressing block body 32 is formed with an insertion core positioning hole 322 for fixing one end of a ceramic insertion core 4. Another end of the pressing block body 32 is formed with a chip accommodating hole 321 for accommodating an isolator chip 5 and a magnetic ring accommodating chamber 323 for accommodating a magnetic ring 7. The chip accommodating hole 321 coaxially communicates with the insertion core positioning hole 322. The magnetic ring accommodating chamber 323 is arranged around the chip accommodating hole 321. The insertion core positioning hole 322 is a round hole. The chip accommodating hole 321 is provided with at least one positioning angle 321a for positioning the isolator chip 5.

Similarly, the isolator chip 5 has a square shape, in order to cooperate with it, the positioning angle 321a is a right angle. Preferably, the number of the positioning angles 321a is four, and they are arranged at four corners of the chip accommodating hole 321.

As in the foregoing embodiment, the pressing block body 32 is an integral structure. The chip accommodating hole 321 may be a square hole, or the four positioning angles 321a of the chip accommodating hole 321 are connected through a curved surface 321b.

The specific structure of the pressing block structure is as described in the foregoing embodiments 1-3, ensuring that the chip accommodating hole 321 is coaxial with the insertion core positioning hole 322, and the magnetic ring 7 is not directly in contact with the isolator chip 5.

The feature of the invention is that the pressing block of the press-fit ceramic insertion core is provided with the isolator chip accommodating hole, and then the magnetic ring is installed in the pressing block, which is suitable for ordinary isolator chips. The isolator chip is directly installed in the pressing block, so that the coaxiality of the chip and the insertion core after assembled is higher, the area required for the chip to cover the optical path is reduced, and the material cost and production cost of the isolator chip are reduced. The chip accommodating hole in the pressing block, used for assembling the isolator chip, is provided with the positioning angle, so that the isolator chip can be positioned more accurately during installation without the need for complicated correction, which greatly reduces the assembly difficulty and cost of the isolator chip, improves production efficiency, and avoids the failure of the isolator chip due to rotation. On the other hand, the chip accommodating hole designed by the present invention reduces the gap between the isolator chip and the hole wall, thereby reducing the use of glue, further reducing the influence of the glue stress on the reliability of the isolator chip, and avoiding glue overflow.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. An optical module, comprising a metal front cover, a ceramic sleeve, a pressing block and a ceramic insertion core, the ceramic sleeve being disposed in the metal front cover and fixed by the pressing block, one end of the ceramic insertion core being disposed in the ceramic sleeve, another end of the ceramic insertion core being fixed in the pressing block, the pressing block including a pressing block body, the pressing block body being an integral structure, one end of the pressing block body being formed with an insertion core positioning hole for fixing the another end of the ceramic insertion core, another end of the pressing block body being formed with a chip accommodating hole for accommodating an isolator chip and a magnetic ring accommodating chamber for accommodating a magnetic ring, the chip accommodating hole coaxially communicating with the insertion core positioning hole, the magnetic ring accommodating chamber being arranged around the chip accommodating hole, the insertion core positioning hole being a round hole, wherein the pressing block body has two opposite end surfaces respectively defining the one end and the another end of the pressing block body, the two end surfaces each having a portion that is recessed, such that a first one of the recessed portions forms the insertion core positioning hole and a second one of recessed portions forms the chip accommodating hole and the first and second recessed portions are of different sizes and shapes having centers in alignment with each other in the axial direction, wherein the another end of the ceramic insertion core and the isolator chip are respectively received in the insertion core positioning hole and the chip accommodating hole that are defined by the first and second recessed portions such that the another end of the ceramic insertion core and the isolator chip are spaced from each other;

wherein the second recessed portion that forms the chip accommodating hole comprises a surrounding wall that surrounds the chip accommodating hole, the surrounding wall having an inner circumferential surface and an outer circumferential surface opposite to the inner circumferential surface, wherein the inner circumferential surface circumferentially delimits an internal space of the surrounding wall that forms the chip accommodating hole in which the isolator chip is received and the outer circumferential surface defines, at least partly, the magnetic ring accommodating chamber, such that the isolator chip received in the chip accommodating hole and the magnetic ring accommodated in the magnetic ring accommodating chamber are separated from each other by the surrounding wall interposed between the isolator chip and the magnetic ring; and wherein the internal space of the surrounding wall that forms the chip accommodating hole comprises at least two positioning corners formed in the inner circumferential surface of the surrounding wall and angularly spaced from each other, wherein the at least two positioning corners respectively correspond to different corners of a shape of the isolator chip such that the isolator chip is positioned between the at least two spaced positioning corners of the internal space of the surrounding wall.

2. The optical module as claimed in claim 1, wherein the at least two positioning corners are each of a right angle.

3. The optical module as claimed in claim 1, wherein the at least two positioning corners comprise four positioning corners.

4. The optical module as claimed in claim 3, wherein the chip accommodating hole is a square hole.

5. The optical module as claimed in claim 3, wherein the four positioning corners of the chip accommodating hole are connected through a curved surface.

6. The optical module as claimed in claim 1, wherein the magnetic ring accommodating chamber is an annular groove and is coaxial with the chip accommodating hole.

7. The optical module as claimed in claim 1, wherein the magnetic ring accommodating chamber is an annular concave platform and is coaxial with the chip accommodating hole.

8. A pressing block structure for an optical module, comprising a pressing block body, the pressing block body being an integral structure, one end of the pressing block body being formed with an insertion core positioning hole for fixing one end of a ceramic insertion core, another end of the pressing block body being formed with a chip accommodating hole for accommodating an isolator chip and a magnetic ring accommodating chamber for accommodating a magnetic ring, the chip accommodating hole coaxially communicating with the insertion core positioning hole, the magnetic ring accommodating chamber being arranged around the chip accommodating hole, the insertion core positioning hole being a round hole, wherein the pressing block body has two opposite end surfaces respectively defining the one end and the another end of the pressing block body, the two end surfaces each having a portion that is recessed, such that a first one of the recessed portions forms the insertion core positioning hole and a second one of recessed portions forms the chip accommodating hole and the first and second recessed portions are of different sizes and shapes having centers in alignment with each other in the axial direction, wherein the another end of the ceramic insertion core and the isolator chip are respectively received in the insertion core positioning hole and the chip accommodating hole that are defined by the first and second recessed portions such that the another end of the ceramic insertion core and the isolator chip are spaced from each other;

wherein the second recessed portion that forms the chip accommodating hole comprises a surrounding wall that surrounds the chip accommodating hole, the surrounding wall having an inner circumferential surface and an outer circumferential surface opposite to the inner circumferential surface, wherein the inner circumferential surface circumferentially delimits an internal space of the surrounding wall that forms the chip accommodating hole in which the isolator chip is received and the outer circumferential surface defines, at least partly, the magnetic ring accommodating chamber, such that the isolator chip received in the chip accommodating hole and the magnetic ring accommodated in the magnetic ring accommodating chamber are separated from each other by the surrounding wall; and wherein the internal space of the surrounding wall that forms the chip accommodating hole comprises at least two positioning corners formed in the inner circumferential surface of the surrounding wall and angularly spaced from each other, wherein the at least two positioning corners respectively correspond to different corners of a shape of the isolator chip such that the isolator chip is positioned between the at least two spaced positioning corners of the internal space of the surrounding wall.

9. The pressing block structure as claimed in claim 8, wherein the at least two positioning corners are each of a right angle.

10. The pressing block structure as claimed in claim 8, wherein the at least two positioning corners comprise four positioning corners.

11. The pressing block structure as claimed in claim 10, wherein the chip accommodating hole is a square hole.

12. The pressing block structure as claimed in claim 10, wherein the four positioning corners of the chip accommodating hole are connected through a curved surface.

13. The pressing block structure as claimed in claim 8, wherein the magnetic ring accommodating chamber is an annular groove and is coaxial with the chip accommodating hole.

14. The pressing block structure as claimed in claim 8, wherein the magnetic ring accommodating chamber is an annular concave platform and is coaxial with the chip accommodating hole.

\* \* \* \* \*